United States Patent [19]
Kim

[11] Patent Number: 6,061,523
[45] Date of Patent: *May 9, 2000

[54] PHOTOGRAPHIC CAMERA AND A CONTROL METHOD THEREOF

[75] Inventor: Hong-Ju Kim, Changwon-si, Rep. of Korea

[73] Assignee: Samsung Aerospace Industries, Ltd., Kyeongsangnam-do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/982,395

[22] Filed: Dec. 2, 1997

[30] Foreign Application Priority Data

Dec. 6, 1996 [KR] Rep. of Korea ............... 96-62285

[51] Int. Cl.$^7$ ................................................. G03B 17/24
[52] U.S. Cl. ....................... 396/60; 396/311; 396/109; 396/121
[58] Field of Search ................... 396/60, 77, 78, 396/435, 436, 311, 296, 315, 317, 318, 106, 121, 109

[56] References Cited

U.S. PATENT DOCUMENTS

| | | |
|---|---|---|
| 4,887,108 | 12/1989 | Taniguchi et al. ............... 396/60 |
| 5,262,818 | 11/1993 | Wada ............................... 396/60 |
| 5,270,755 | 12/1993 | Ohno et al. ................... 396/318 X |
| 5,291,233 | 3/1994 | Hashimoto et al. .............. 396/60 |
| 5,589,908 | 12/1996 | Irie ................................. 396/77 |
| 5,615,398 | 3/1997 | Matsuyama ..................... 396/77 |

*Primary Examiner*—W. B. Perkey
*Attorney, Agent, or Firm*—Howrey & Simon

[57] ABSTRACT

A photographic device and a control method thereof in which a user can take a portrait photograph by changing a photographic screen range according to a size and a number of objects to be photographed. The photographic device includes a photographic selection block for selecting a photographic operation; a mode selection block for selecting a portrait photographic mode; a distance measuring block for measuring a distance from the object; a micro-controller for calculating a size of the object according to a signal outputted from the distance measuring block in response to the operation of the photographic selection block when the portrait photographic mode is selected, for setting a photographic screen range according to the calculated size of the object, and for controlling the photographic operation according to the set photographic screen range; and a photographic block for performing the portrait photograph according to the photographic screen range set by the micro-controller.

10 Claims, 4 Drawing Sheets

Classic Size:Laxb
Panoramic Size:axPb
High-vision Size:axb and 6,061,523

PHOTOGRAPHIC CAMERA AND A CONTROL METHOD THEREOF

BACKGROUND OF THE INVENTION (a) Field of the Invention

The present invention relates to a photographic device and a method of controlling such a device. More particularly, the present invention relates to a photographic device and a control method thereof by which a user can take a portrait photograph by changing a size of photographic paper in accordance with a size of a subject and a number of subjects to be photographed.

(b) Description of the Related Art

Generally, a portrait is a photograph of a person, particularly a face of the person. Conventional cameras have a portrait photographic function wherein a controller in the camera changes a focal distance of a lens barrel according to a distance from a subject to be photographed. Only an upper half of a body of the subject is photographed if a user selects the portrait photographic function.

However, the conventional camera having a portrait photographic function has disadvantages due to a fixed photographic screen range of film regardless of the size of a subject being photographed. A high quality portrait cannot be obtained because the subject fills a photographic screen range fully when the subject is large, and too much landscape is included in the photographic screen range when the subject is small.

SUMMARY OF THE INVENTION

An object of the present invention is to provide a photographic device and a control method thereof by which a user can take a high quality portrait by adjusting a photographic screen range according to a size and a number of subjects to be photographed.

To achieve the objects and in accordance with the purpose of the invention, as embodied and broadly described herein, a portrait photographic device includes a photographic selector which selects a photographic operation; a mode selector which selects a portrait photographic mode; a distance measuring device which measures a distance from an object; a controller which calculates a size of the object in accordance with a signal outputted from the distance measuring device in response to the operation of the photographic selector when the portrait photographic mode is selected, sets a photographic screen range according to the calculated size of the object, and controls a photographic operation according to the set photographic screen range; and a photographic device which takes the portrait photograph in accordance with the photographic screen range set by the controller.

According to another aspect of the present invention, a control method for a portrait photographic device includes the steps of measuring a distance from an object when a photographic operation is selected; setting a position for moving a lens barrel according to the distance from the object; setting a photographic screen range in accordance with a size of the object after measuring the size of the object to be photographed; and taking a portrait photograph of the object in accordance with the photographic screen range after moving the lens barrel to the set lens barrel position.

Additional objects and advantages of the present invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings illustrate an embodiment of the present invention and, together with the description, serve to explain the principles of the invention.

DETAILED DESCRIPTION OF THE PREFERRED EMBODIMENT

One embodiment of the present invention will become apparent from a study of the following detailed description when viewed in light of the drawings.

Figure 1:
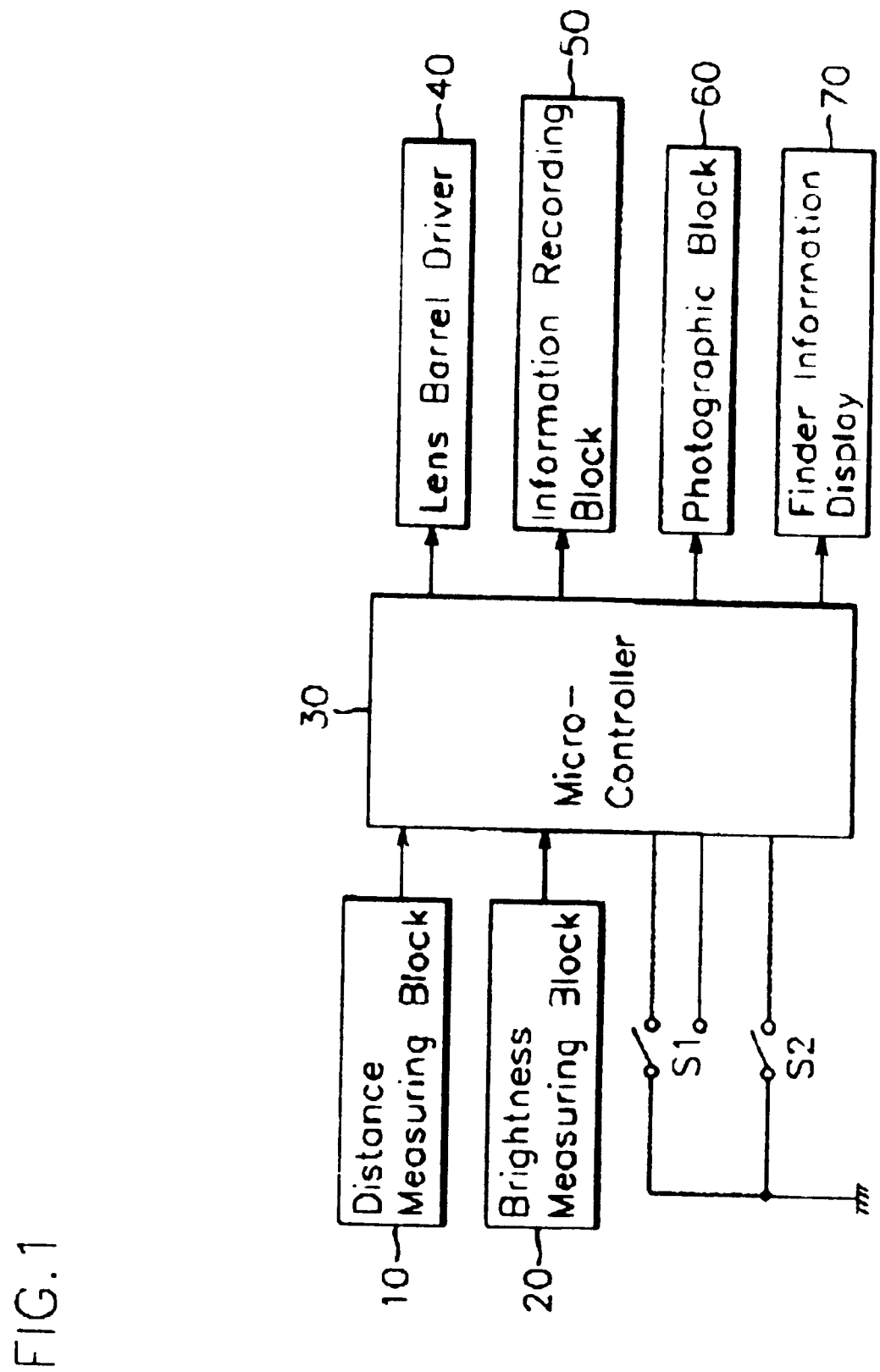
FIG. 1 is a block diagram of a photographic device according to a preferred embodiment of the present invention.

As illustrated in FIG. 1, a photographic device according to a preferred embodiment of the present invention includes a release switch S1, the operation state of which is changed from a first state to a second state; a mode selection switch S2 for selecting a portrait photographic mode; a distance measuring block 10 for measuring a distance from an object and a size of the object; a brightness measuring block 20 for measuring ambient brightness around the object; a micro-controller 30 connected to the switches S1 and S2 and the measuring blocks 10 and 20, for outputting a plurality of control signals which control the portrait photographic operation; a lens barrel driver 40 connected to an output terminal of the micro-controller 30, for moving a lens barrel to a corresponding position according to the applied control signal; an information recording block 50 connected to the output terminal of the micro-controller 30, for recording information corresponding to a set photographic screen range according to the applied control signal; a photographic block 60 connected to the output terminal of the micro-controller 30, for taking a photograph of the object according to the applied control signal; and a finder information display 70 connected to the output terminal of the micro-controller 30, for displaying the information on a finder according to the applied control signal.

The distance measuring block 10 of the present invention includes a plurality of distance measuring elements having a light emitting block for emitting infrared rays toward the object and a light receiving block for receiving the infrared rays reflected by the object. Based on the received infrared rays, a distance from the camera to the object and the size of the object are calculated.

The information recording block 50 of the present invention includes a plurality of light emitting diodes for recording bits of photographic information on film according to an ON/OFF state of each light emitting diode.

Figure 2A:
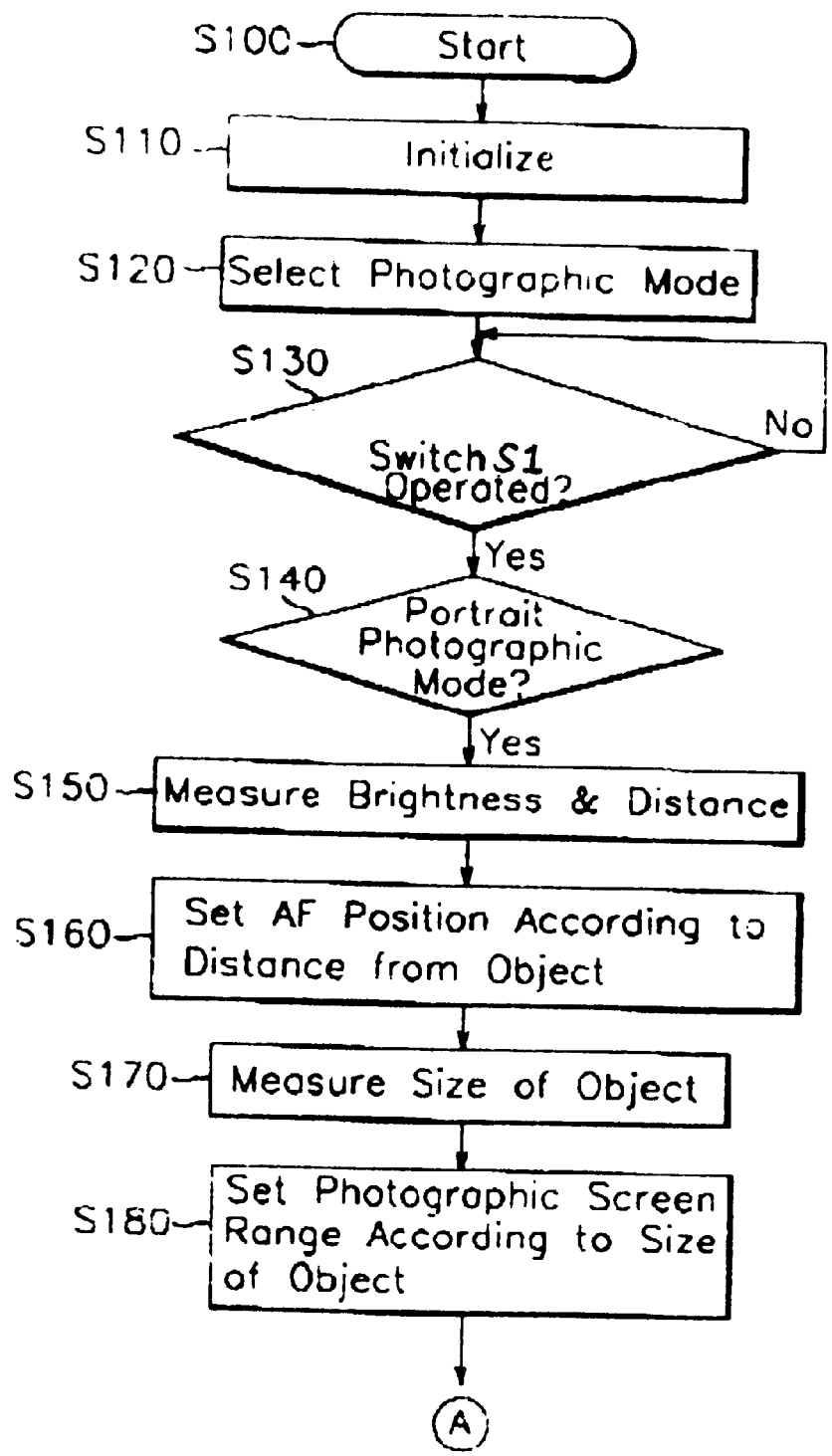
FIGS. 2A and 2B are flow charts showing the operational steps of a photographic method according to the preferred embodiment of the present invention.
Figure 2B:
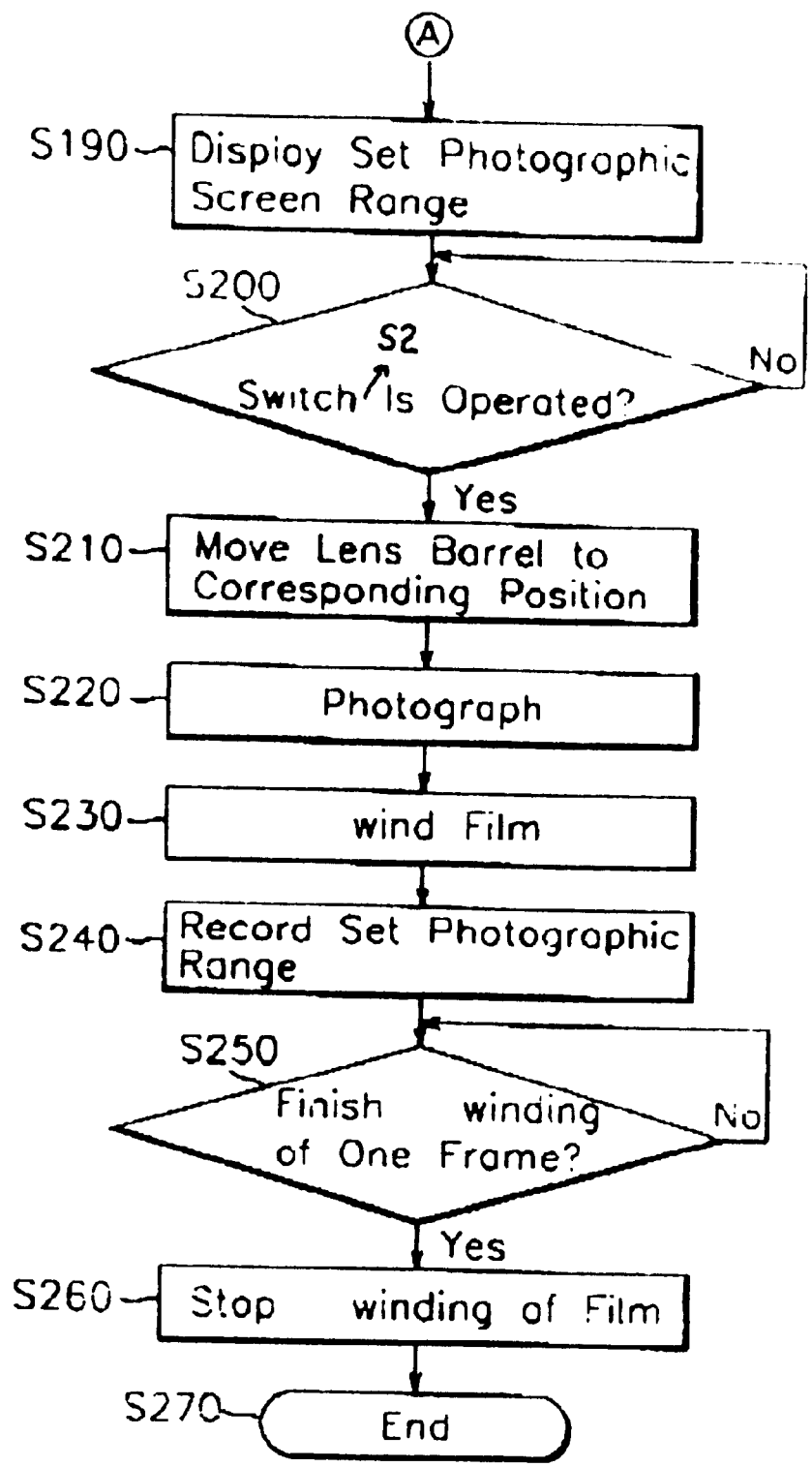

The operation of the photographic device according to the preferred embodiment of the present invention is explained in detail hereinafter. Referring to FIGS. 2A and 2B, the micro-controller 30 sets a corresponding photographic mode according to the operation of the mode selection switch S2 when power is applied to the camera and the camera is placed in a standby mode (Steps 110 and 120).

The micro-controller 30 sets the portrait photographic mode and performs a portrait photographic operation according to a routine illustrated in FIGS. 2A and 2B when the mode selection switch S2 is operated to take the photograph of the face of a person.

The micro-controller 30 checks whether the present photographic mode is the portrait photographic mode when the switch S1 is operated and the photographic mode is selected (Steps 130 and 140). The micro-controller 30 measures the distance from the object by activating the distance measuring block 10, and measures the ambient brightness around the object by activating the brightness measuring block 20 (Step 150).

The distance measuring block 10 includes a plurality of light measuring elements which receive the reflected infrared rays from the object after emitting a plurality of infrared rays toward the object, and outputs a corresponding electrical signal to the micro-controller 30.

The distance-measuring block 10 emits the infrared rays to different positions of the object. The micro-controller 30 measures the distance from the object to be photographed according to a signal outputted from the distance measuring block 10 and measures the size of the object according to a signal corresponding to the infrared rays reflected from a plurality of positions of the object.

The micro-controller 30 calculates an AF (auto focus) position in which only the upper half of the object is photographed according to the distance from the object (Step 160) and sets the photographic screen range according to the size of the object after measuring the distance from the object according to the operation of the switch S1.

Figure 3:
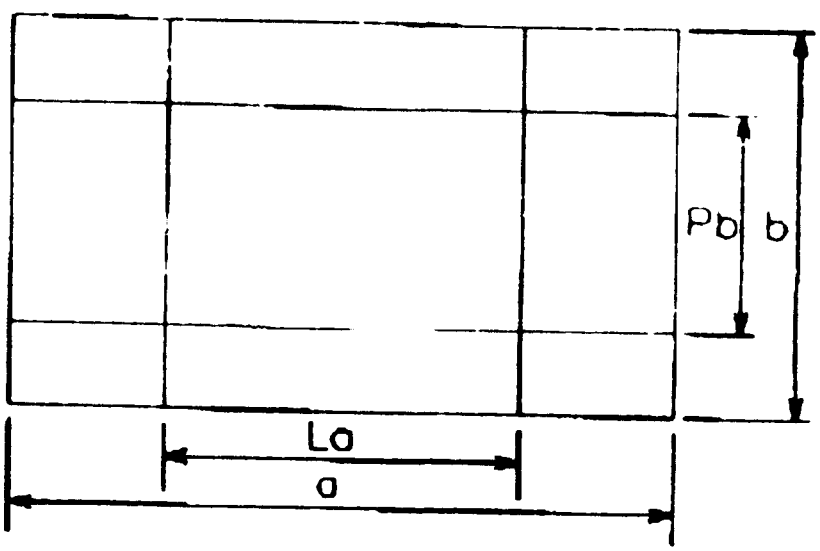
FIG. 3 illustrates a film screen size according to the preferred embodiment of the present invention.

Generally, the photographic screen range is the range in which the photograph is taken, and may be classified into a classic size, a panoramic size, and a high-vision size according to the length and width of a print recorded on a frame as illustrated in FIG. 3. Generally, the high-vision size is a film size of 27.4×15.6 mm, the panoramic size is the film size of 127.4×9.6 mm, and the classic size is the film size of 22.3×15.6 mm.

In the preferred embodiment of the present invention, the photographic screen range is set to the classic size when the object to be photographed is one or two persons, and the photographic screen size is set to the high-vision size when the object is more than two persons. However, the photographic screen size is not limited to these settings, and may be set by the user.

In the preferred embodiment, the micro-controller 30 sets the photographic screen size to the classic size when the size of the object corresponds to a first setting range, (i.e., the object is one or two persons), and sets the photographic screen mode to the high-vision size when the size of the object corresponds to a second setting range, (i.e., the object includes more than two persons) (Steps 170 and 180).

The micro-controller 30 displays the photographic screen range by driving the finder information display 70 after setting the photographic screen range according to the size of the object (Step 190).

The photographic screen range is displayed on the finder according to the operation of the finder information display 70, and accordingly the user may check that the photographic screen range is changed through the finder.

The micro-controller 30 moves the lens barrel to the AF position calculated according to the distance from the object by driving the lens barrel driver 40 and takes the photograph by driving the photographic block 60 when the switch S2 is operated after setting the photographic screen range for taking the photograph of the upper half of the persons according to the size of the object (Steps 200 to 220).

The light which becomes incident through a photographic lens according to the operation of the photographic block 60, is recorded on the film through a shutter or a diaphragm.

The micro-controller 30 performs a winding operation of the film by driving a film transferring block (not shown) after taking the photograph of one frame. Here, the micro-controller 30 records the information corresponding to the photographic screen range set according to the size of the object on the film by driving the information recording block 50 (Steps 230 and 240). Micro-controller 30 may be any programmable microcontroller capable of being programmed to implement the functions described herein.

The information recording block 50 records bits of information on the film of the corresponding frame in the preferred embodiment of the present invention.

Accordingly, a printing machine reads the screen size information recorded on the film manually or automatically when printing the photograph and the photograph is printed according to the read screen size information.

The photographic information may be magnetically recorded on the film using a magnetic head when transferring the film in the case that the film, on which a magnetic material is deposited, is used besides recording the bits of information. The microcontroller controller 30 ends the film winding operation when one frame of film is wound (Steps 250 and 260).

As described above, the present invention provides a photographic device and a control method thereof by which the user can take a portrait photograph by changing the photographic screen range in accordance with the size and the number of objects to be photographed.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A photographic camera, comprising:
   a photographic selector which selects a photographic operation;
   a mode selector switch which selects a portrait photographic mode;
   a distance measuring device which measures a distance from an object, including a plurality of distance measuring elements that emit infrared rays toward the object and receive the infrared rays reflected by the object;
   a controller which calculates a size of the object in accordance with a plurality of signal outputs from the distance measuring device when the photographic selector selects the portrait photographic mode, zooming a lens for the portrait photographic mode according to the measured object distance, sets a photographic screen range according to the calculated size of the object, and controls a photographic operation according to the set photographic screen range;
   a display which displays to a user the photographic screen range on a finder; and
   a photographic device which takes a portrait photograph of the object in accordance with the photographic screen range set by the controller and records information corresponding to the photographic screen range on a film.

2. The photographic camera of claim 1, wherein the controller controls the display of the photographic screen range on the finder by driving the display after setting the photographic screen range in accordance with the size of the object.

3. The photographic camera of claim 1, further comprising a recorder which records information corresponding to the photographic screen range on film.

4. The photographic camera of claim 3 wherein the controller controls the recording of information corresponding to the photographic screen range on the film by driving the recorder after setting the photographic screen range in accordance with the size of the object.

5. The photographic camera of claim 1, wherein an operation state of the photographic selection means is changed from a first state to a second state, and the controller sets the photographic screen range according to the size of the object when the photographic selector is operated in the first state and controls the photographic operation according to the set photographic screen range when the photographic selector is operated in the second state.

6. The photographic camera of claim 1, further comprising a lens barrel driver which moves a lens barrel, and wherein the controller sets a lens barrel position according to the measured distance from the object and moves the lens barrel driver according to the set lens barrel position.

7. The photographic camera of claim 1, wherein the photographic screen range is a classic size, a panoramic size or a high-vision size.

8. A method for controlling a photographic camera, comprising the steps of:
 (a) measuring a distance from an object and a size of an object when a photographic operation is selected;
 (b) setting a position for moving a lens barrel according to the measured distance from the object;
 (c) setting a photographic screen range according to the measured size of the object to be photographed;
 (d) displaying the photographic screen range on a finder; and
 (e) taking a photograph of the object in accordance with the photographic screen range after moving the lens barrel to the set lens barrel position.

9. The method of claim 8, wherein said step (d) further includes the step of recording information corresponding to the photographic screen range on the film.

10. The method of claim 8, wherein the photographic screen range set according to the measured size of the object to be photographed is one of a group comprising a classic size, a panoramic size or a high-vision size.

* * * * *